Oct. 8, 1968   F. J. ADAMS   3,404,704
POWER-STEERING VALVE
Filed June 18, 1965   2 Sheets-Sheet 2
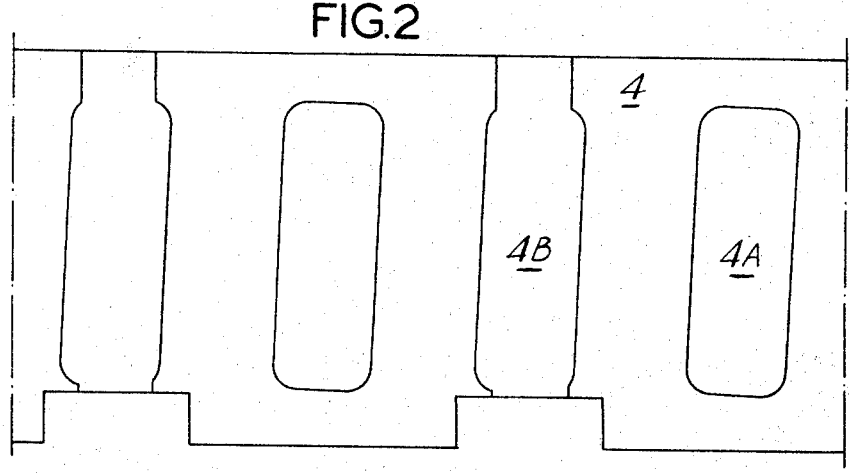
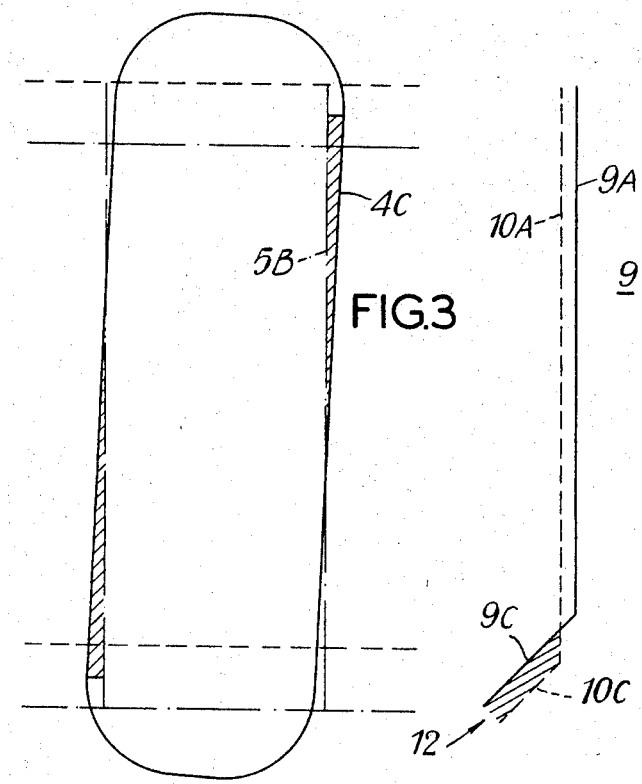
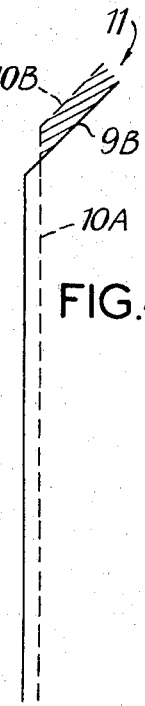

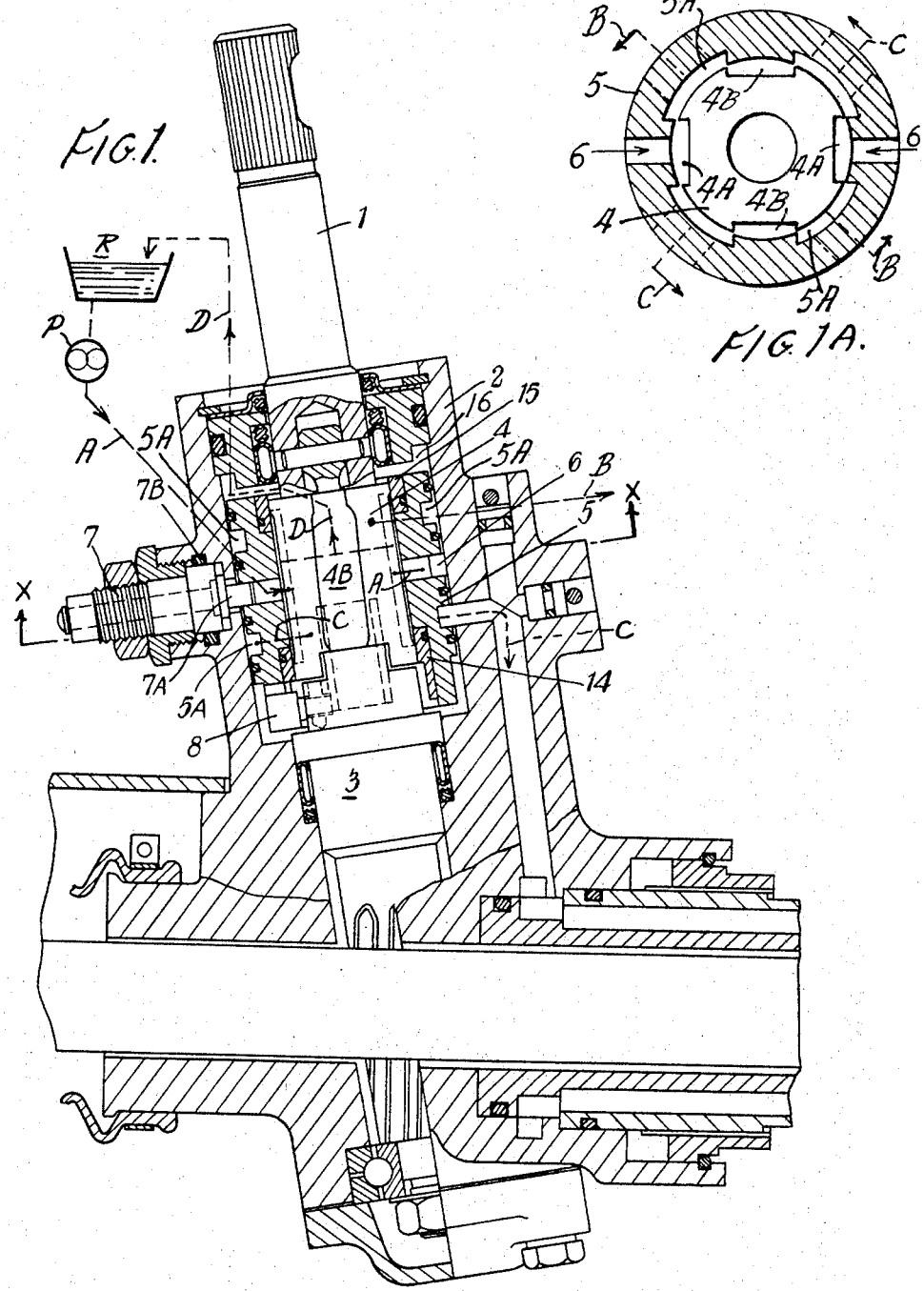

United States Patent Office 3,404,704
Patented Oct. 8, 1968

3,404,704
POWER-STEERING VALVE
Frederick J. Adams, Houghton Regis, England, assignor to Cam Gear (Luton) Limited, a company of Great Britain
Filed June 18, 1965, Ser. No. 465,097
Claims priority, application Great Britain, Sept. 18, 1964, 38,164/64
9 Claims. (Cl. 137—625.22)

ABSTRACT OF THE DISCLOSURE

The invention—an improvement in the field of rotary valves for use in power-assisted vehicle steering gear—resides in means for adjusting the neutral position, by axial movement, of relatively rotatable and mutually rotatable valve elements by access which is external to the fixed body in which the elements are mutually rotatable; the valve being of the known type in which the relative rotation is dependent on the torsional strain imposed by the driver in a torsionally elastic member.

---

This invention relates to power-assisted steering or like gear and more particularly to valves used therein.

The invention is concerned with the kind of valve which is known in the art of power-assisted steering for vehicles, in which two coaxial valve members one within the other are rotatable together for example by direct connection to the steering column, and which are allowed some small degree of relative rotation against torsionally resilient interconnection, this relative rotation being the effective valve movement. Usually such valves are used as "open center" valves, i.e., which in a neutral position permit flow of fluid through oppositely handed ports, those of one hand being more opened and those of the other hand being more closed when the valve operates. It is possible, however, to make such valves so that they are completely closed in a neutral position, the porting of only one hand being opened when the valve operates.

The invention relates to valves of the aforesaid general kind and includes power-assisted steering gear for vehicles incorporating such a valve.

An object of the invention is the provision of adjusting means for such a valve for its fine adjustment to a mean or "neutral" condition.

A further object is the provision of adjusting means which are accessible from outside the steering box or valve housing, with which object there goes the further object that the valve can be adjusted when the working fluid pressure is on, and can be adjusted if required when the steering is "on lock," that is to say without the need to centralize the steering.

A further object is to provide valve adjusting means which, being accessible from outside, lends itself to remote control so that the driver could if required be afforded a valve adjustment from his driving position.

Yet another object is to provide exceptionally sensitive and fine adjustment for such a valve.

Enlarging somewhat on the kind of valve to which the invention applies, which will be recognizable to those acquainted with the art, the kind usually comprises a steering box or valve housing into which a shaft extends from the steering column and within this housing, continues as a torque bar; to one end of the torsionally resilient part of this bar is attached for rotation one element of the valve, the other element of which is attached to the other end of the resilient part. These valve elements are slightly relatively rotatable under the torsional restraint and in so relatively rotating, the areas of ports in the valve elements more, or less, overlap or are closed, whereby pressure fluid is allowed to pass one way or the other for power assistance to the steering, or is in the neutral position, equalized. Moreover should there be a failure of pressure fluid supply, the torque bar can transmit required steering effort mechanically from the steering column direct to the steering gear.

Particularly when such a valve is used in vehicle steering gear to control power-assistance, it is desirable to be able to adjust the valve, either initially after assembly of the steering gear, or from time to time. It has been proposed that this be achieved by providing an eccentric element the rotation of which (by way of adjustment), initially positions the two valve members to rotational or angular sense. Such a device is known in which the eccentric element was accessible only by removing an outer cap and by reaching the element with a tool when the steering gear is in practically neutral position. It was therefore not practicable to effect an adjustment when the fluid-pressure was "on," nor if the steering was "on lock." The present invention removes these disabilities. Moreover, it can affort a more sensitive adjustment than the previous designs. And further, by the present invention it becomes feasible—if required—to provide for adjustment remotely, for example by the driver, and thus to enable the driver to make an adjustment whilst driving, so that he could counterbalance some condition (such as driving a tractor traversing a slope) whereby steering may be more effortless.

The invention will now be described by way of example, with reference to the accompanying drawings. In these:

FIGURE 1 is a sectional view of the power-assistance valve arrangement of a rack-and pinion type vehicle steering gear;

FIGURE 1A is a partial section on X—X of FIGURE 1;

FIGURE 2 is a developed view of the slots in the first or inner valve members;

FIGURE 3 indicates on a larger scale, the relationship of a land and groove showing the triangular port areas afforded; and FIGURE 4 diagrammatically illustrates an alternative way of forming the lands and grooves.

In these figures 1 represents the usual shaft which is, in effect, a continuation of the steering column. This shaft is suitably borne in and sealed wtih the valve housing 2, which may be considered to be the steering box or casing. The pinion element 3 is likewise borne in the housing 2, substantially coaxially with the shaft 1. The valve members 1 and 3 are torsionally connected by a somewhat resilient torque bar, the upper end of which can be seen in FIGURE 1. Such a construction, and the various details of bearings, seals, etc., being known, or mere matters of practice, require no detailed description. Thus far, the device accords with the known kind of valve to which the invention relates.

The shaft 1 in part of its length has a first valve member 4 which presents (say) four slots the shape and inclination of which are more clearly to be seen in FIGURE 2. Two of these slots 4A are shorter than the other two (4B). These slots are defined by lands which as in known arrangements, are complementary to longitudinal slots formed internally in the second or sleeve valve member 5 which has radial ducts and external circumferential fluid passages and channels such as shown at 5A. In FIGURE 3, the edges of such a slot are indicated at 5B, the co-operating and port-defining edges of the slots 4A (which are also, of course, the edges of the lands) being indicated by 4C.

In the sleeve member 5 there is an annular external groove 6. Passing through the housing 2, is an adjustment spindle or pin 7, suitably borne and sealed as by an O-ring 7B. The pin 7 has an eccentric on its inner end 7A which is engaged in the groove 6. The sleeve member 5 is, within limits, movable axially along the valve part 4, but is secured against rotation relative to the pinion part 3 by a pin 8 engaged in an axially directed slot.

In normal use and known manner, relatively slight steering torque is transmitted from 1 to 3 and causes torsional strain in the torque bar. This strain results in a slight relative rotation between the first and the second valve members 4 and 5. Such relative rotation so opens and closes the exposed port areas as to direct the hydraulic power-assistance pressure to one side or the other of the power-assistance motor, the ports thus being "handed" to right and left or clockwise and anticlockwise. Now, if there be "no steer" the port openings must be such that the hydraulic efforts are balanced in the usual power-assisting motor, and therefore a precise "neutral" position is required of the valve. This is achieved by rotating the pin 7, the eccentric 7A then moving the second valve member 5 axially relatively to the first member 4, and very sensitively changing the effective port areas, illustrated by the cross-hatched areas in FIGURE 3. As is seen, these are very elongated and thin triangles, and consequently quite small axial adjustments between the valve members 4 and 5, result in fine adjustment of the fluid flows through these areas.

Clearly the pin 7, being externally accessible, can very simply be remotely controlled by any conventional remote-control means, so that the fitter or driver can search for the neutral condition, and if required can actually bias the power-assistance to right or left. Also, the port-defining edges of both the lands and the grooves may be inclined to the common axis, though, as will have been seen, it suffices that the edges of either member be inclined, those of the other being axial (as in FIGURES 1–3).

The fluid connections controlled by the valve can be understood by reference to FIGURES 1 and 1A, in which passages are indicated diagrammatically by arrowed broken lines. These bear single-letter references as follows. From a fluid reservoir R and pumped by pump P, fluid flows along the broken line A into the groove 6, whence (when the relative position of the valve elements so permits) it flows via valve grooves 4A, either to the lower circumferential channel 5A and thence via line C to one side of the motor; or in the alternative valve position it flows (still via valve grooves 4A) to the upper channel 5A and thus via line B to the other side of the motor. The connections to achieve this are not all shown, but they are indicated in FIGURE 1A. They are provided for in the manner common in the art, of ducts or drillings formed in the various elements, with appropriate unions and external pipes where required. Fluid from the vented side of the motor returns reversely along one or other of the lines B or C, into grooves 4B, and thence into the appropriate channel 5A whence it is collected in a chamber 16 in the body 2 above the valve elements; from the chamber 16 the relief fluid passes back to resevoir R, its flow path being indicated by line D. It is convenient to bear in mind that the groves 4A are always pressure passages, whilst grooves 4B are return passages at virtually no pressure.

The foregoing description is of a valve of the so-called "open center" type, that is to say, one which in its neutral position permits some flow of fluid through it in two conduits, this being known practice in power-assisted steering. It is to be understood, however, that the invention can be applied to a valve of somewhat similar general form but which, in the neutral condition nearly or completely prevents flow, flow only occuring when the two elements are slightly relatively rotated. The same fine and precise adjustment of the neutral position can then be achieved in the same way.

It is also to be understood that the ports or lands do not need to have parallel edges which are inclined throughout as described above, but may have edges which are parallel with the axis of rotation throughout some or most of their length, the angular effect being afforded by forming the edges with divergence only to their ends, that at one end being handed oppositely to that at the other end. Such formation may be achieved by somewhat simple machining operations involving, for example, straight axial slotting or milling, with only a small amount of angular cutting at the two ends. FIGURE 4 indicates such a form diagrammatically; in this a slot 9 is shown, having mainly axial parallel edges 9A, and a land is shown in dotted line, with complementary parallel and axially directed edges 10A. At one end of the slot 9, one edge 9A is formed divergently as seen at 9B and at the other end the opposite edge 9A is similarly divergent as at 9C. The land has complementary divergences as at 10B, 10C. The open or exposed areas 11, 12 are again cross-hatched, and although in this case they are not triangular, it can be seen that when the two valve ports are relatively adjusted axially, one area 11 is increased whilst the other 12 is reduced and vice versa.

The invention is of course, not limited to the particular arrangements described above which are by way of example and not definitive of the scope of the invention. In particular, the pin 7 may, by any ordinary remote control means (not illustrated) be rotated from a distance and any conventional means for so doing will be understood to be available to those conversant with control arrangements.

I claim:
1. In a rotary valve of the kind stated, a fixed valve body having a cylindrical bore; a rotatable input shaft extending into said bore coaxially from one end thereof; a torsionally elastic torque bar within said body and positively rotatable by said input shaft; a rotatable output shaft extending from within said body out of said bore coaxially with said input shaft and positively rotatable by said torque bar; an inner cylindrical valve member rotatably secured to one end of said torque bar; an outer cylindrical valve member cooperatively surrounding said inner valve member and rotatably secured to the other end of said torque bar, said outer valve member being axially adjustable relative to said inner valve member; surfaces formed in the outer surface of said outer valve member defining therein an annular groove; a rotatable adjustment part borne by said body; an eccentric element carried by said part within said bore in engagement with said annular groove; surfaces formed in said inner valve member defining lands and ports of the outer surface thereof; surfaces formed in said outer valve member defining lands and ports complementary to those of said inner member, said surfaces of both valve members extending in the generally axial direction of said valve members and those of one of said valve members being inclined from the axial direction whereby axial relative movement between said valve members sensitively varies the effective areas of overlap of the ports defined in the valve members.

2. In a valve according to claim 1, the formation of said port-defining surfaces so that the developed area of overlap is in the form of an elongated triangle.

3. In a valve according to claim 1, the formation of said port-defining surfaces so that the developed area of overlap is, at one end of the valve members, an area defined by surfaces inclined from the common axis of the valve members in one hand of rotational sense and at the other end is oppositely handed.

4. A rotary valve device, comprising
an outer fixed body having a bore of circular section;
an outer valve member arranged rotatably in said bore and with some axial freedom therein and itself having therein a second bore of circular section;
an inner valve member arranged for limited rotation in said second bore;
a torsionally elastic element connected for rotation with said valve members and so that its torsional strain defines the said limited rotation; and means supported by, and accessible from outside of, said body engaging said outer valve member to move said outer valve member for axial adjustment relative to said inner valve member whilst permitting the rotation of said outer valve member in said body.

5. A rotary valve comprising a valve casing, an inner ported valve member in said casing, an outer ported valve member in said casing surrounding said inner ported valve member, said inner and outer members being both collectively and relatively rotatable and being relatively axially shiftable, a torsionally elastic bar attached against rotation at one end to said inner member and at its other end to said outer member, generally axially extending port surfaces defining the ports of said members, the port surfaces of at least one of said members being inclined to the common axis of the members, and means for adjusting the members comprising an eccentric element, a rotatable adjustment part mounted for rotation in the casing and accessible for rotation from outside said casing for rotation of the eccentric element, and edges formed in one member defining an annular groove engaged by said eccentric element whereby rotation of said eccentric element from outside the casing controls the axial position of said one member relative to the other member.

6. The valve of claim 5 including means for sealing said rotatable adjustment part with said casing.

7. A power-steering valve actuated by a steering column to control flow of working fluid which is adapted to be adjusted during operation in a power steering system which comprises a casing, an inner valve member and an outer valve member in said casing, said members being rotatable with the steering column and slightly rotatable relative to each other, said members having lands and grooves complementarily cooperating to expose more and less port areas for fluid flow according to the sense of said relative rotation, the lands and grooves being elongated in the general axial direction as referred to the common axis of the members, at least one of said members having grooves with edges inclined to the axis of the members so that relative axial movement between the members will increase and decrease the exposed port areas to adjust the effective neutral condition of the valve, and means carried by the valve casing accessible from the outside of the casing for adjusting the members in the casing axially relative to each other without opening the casing.

8. The valve of claim 7 wherein said means for adjusting the members axially includes an externally accessible locking member for holding said means in fixed position relative to the casing.

9. A hydraulic power steering valve adapted to be adjusted to vary the steering assist during operation without loss of working fluid pressure and without requiring centralizing of the steering gear which comprises a valve body, an outer valve member mounted in the body for rotatable and axial movement, an inner valve member rotatably mounted in the outer valve member, a rotatable steering shaft extending from the body, means actuated by said shaft to effect relative movement of the inner and outer valve members, said inner and outer valve members having ports adapted to register when the valve members are relatively moved by said shaft to control flow of power fluid in accordance with the direction of rotation of the shaft and to stop said flow when the shaft is stationary, and means mounted in said casing and accessible from outside of said casing without opening the casing for axially shifting one of said valve members to change the registration of said ports to vary said control of power fluid flow.

References Cited

UNITED STATES PATENTS

| | | | |
|---|---|---|---|
| 2,434,668 | 1/1948 | May | 91—375 |
| 2,630,136 | 3/1953 | Brandes et al. | 137—625.69 XR |
| 3,138,069 | 6/1964 | Bishop | 91—375 |
| 3,296,939 | 1/1967 | Eddy | 137—625.24 XR |

HENRY T. KLINKSIEK, *Primary Examiner.*